US008001403B2

(12) United States Patent
Hamilton et al.

(10) Patent No.: US 8,001,403 B2
(45) Date of Patent: Aug. 16, 2011

(54) DATA CENTER POWER MANAGEMENT UTILIZING A POWER POLICY AND A LOAD FACTOR

(75) Inventors: James R Hamilton, Bellevue, WA (US); James J Freely, Marshall, VA (US); Mike Neil, Mercer Island, WA (US); Michael J Manos, North Bend, WA (US); Michael R Fortin, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 770 days.

(21) Appl. No.: 12/049,050

(22) Filed: Mar. 14, 2008

(65) Prior Publication Data

US 2009/0235097 A1 Sep. 17, 2009

(51) Int. Cl.
*G06F 1/32* (2006.01)
*G06F 1/00* (2006.01)

(52) U.S. Cl. .................. 713/320; 713/300; 713/323
(58) Field of Classification Search .......... 713/320
See application file for complete search history.

(56) References Cited

U.S. PATENT DOCUMENTS

| | | | | |
|---|---|---|---|---|
| 6,885,115 | B2 * | 4/2005 | Hatori et al. | 307/80 |
| 6,986,069 | B2 | 1/2006 | Oehler et al. | |
| 7,135,956 | B2 | 11/2006 | Bartone et al. | |
| 7,143,300 | B2 | 11/2006 | Potter et al. | |
| 7,210,048 | B2 | 4/2007 | Bodas | |
| 7,213,065 | B2 | 5/2007 | Watt | |
| 7,467,311 | B2 * | 12/2008 | Bahali et al. | 713/320 |
| 7,617,406 | B2 * | 11/2009 | Yasuo | 713/320 |
| 7,861,102 | B1 * | 12/2010 | Ranganathan et al. | 713/300 |
| 2004/0230848 | A1 | 11/2004 | Mayo et al. | |
| 2005/0138440 | A1 * | 6/2005 | Barr et al. | 713/300 |
| 2006/0112286 | A1 | 5/2006 | Whalley et al. | |
| 2006/0168975 | A1 | 8/2006 | Malone et al. | |
| 2006/0184936 | A1 | 8/2006 | Abels et al. | |
| 2007/0078635 | A1 | 4/2007 | Rasmussen et al. | |
| 2008/0178029 | A1 * | 7/2008 | McGrane et al. | 713/324 |
| 2008/0288193 | A1 * | 11/2008 | Claassen et al. | 702/61 |

OTHER PUBLICATIONS

Moore, et al., "Data Center Workload Monitoring, Analysis, and Emulation", available at least as early as Jul. 10, 2007, at <<http://issg.cs.duke.edu/publications/caecw2005.pdf>>, pp. 8.
Moore, et al., "Weatherman: Automated, Online, and Predictive Thermal Mapping and Management for Data Centers", available at least as early as Jul. 10, 2007, at <<http://www.cs.duke.edu/~justin/papers/icac06weatherman.pdf>>, pp. 10.
Presentation of Architecture for Modular Data Centers. James Hamilton Jan. 8, 2007 PDF format of a Power Point Presentation.
Designing and Deploying internet-scale services Jan. 17, 2008; Architect, Windows Live Platform Services, WEB: research.microsoft.com/~jamesrh.
An Architecture for Modlar Data Centers, James Hamilton; WEB: research.microsoft.com/~jamesrh Large numbers of low-cost, low-reliability commodity components are rapidly replacing high-quality, mainframe-class systems in data centers, Jan. 7-10, 2007, Asilomar, CA. USA 3rd Biennial (CIDR).

* cited by examiner

*Primary Examiner* — Suresh Suryawanshi
(74) *Attorney, Agent, or Firm* — Lee & Hayes, PLLC

(57) ABSTRACT

An exemplary method for managing power consumption of a data center includes monitoring power consumption of a data center, assessing power consumption with respect to a billing equation for power, based on the assessment, deciding whether to implement a power policy where the power policy reduces instantaneous power consumption by the data center and increases a load factor wherein the load factor is an average power consumed by the data center divided by a peak power consumed by the data center over a period of time. Various other methods, devices, systems, etc., are also disclosed.

20 Claims, 8 Drawing Sheets

DATA CENTER POWER MANAGEMENT UTILIZING A POWER POLICY AND A LOAD FACTOR

BACKGROUND

Running an internet scale service successfully is not an easy or cheap business to be in. Managing a set of thousands of servers running different components spreading over various data centers in order to achieve high availability, and performance is a challenging task.

One aspect that is usually overlooked or prioritized lower when it comes to the manageability of a data center is the energy cost of running the data center. With new higher-end hardware, needing more energy to run and with energy prices going up, the energy cost of running a data center is becoming a bigger part of the total cost. Indeed, power costs are rising while the cost of computing is rapidly declining, which means that power costs will soon dominate.

SUMMARY

An exemplary method for managing power consumption of a data center includes monitoring power consumption of a data center, assessing power consumption with respect to a billing equation for power, based on the assessment, deciding whether to implement a power policy where the power policy reduces instantaneous power consumption by the data center and increases a load factor wherein the load factor is an average power consumed by the data center divided by a peak power consumed by the data center over a period of time. Various other methods, devices, systems, etc., are also disclosed.

DESCRIPTION OF DRAWINGS

Non-limiting and non-exhaustive examples are described with reference to the following figures.

DETAILED DESCRIPTION

Various exemplary methods, devices and system described herein pertain to managing power in one or more data centers. An exemplary management system is configured to manage power consumption based on data center resources and workload. Such a system can also account for how power is billed to increase data center efficiency and reduce operating costs.

Figure 1:
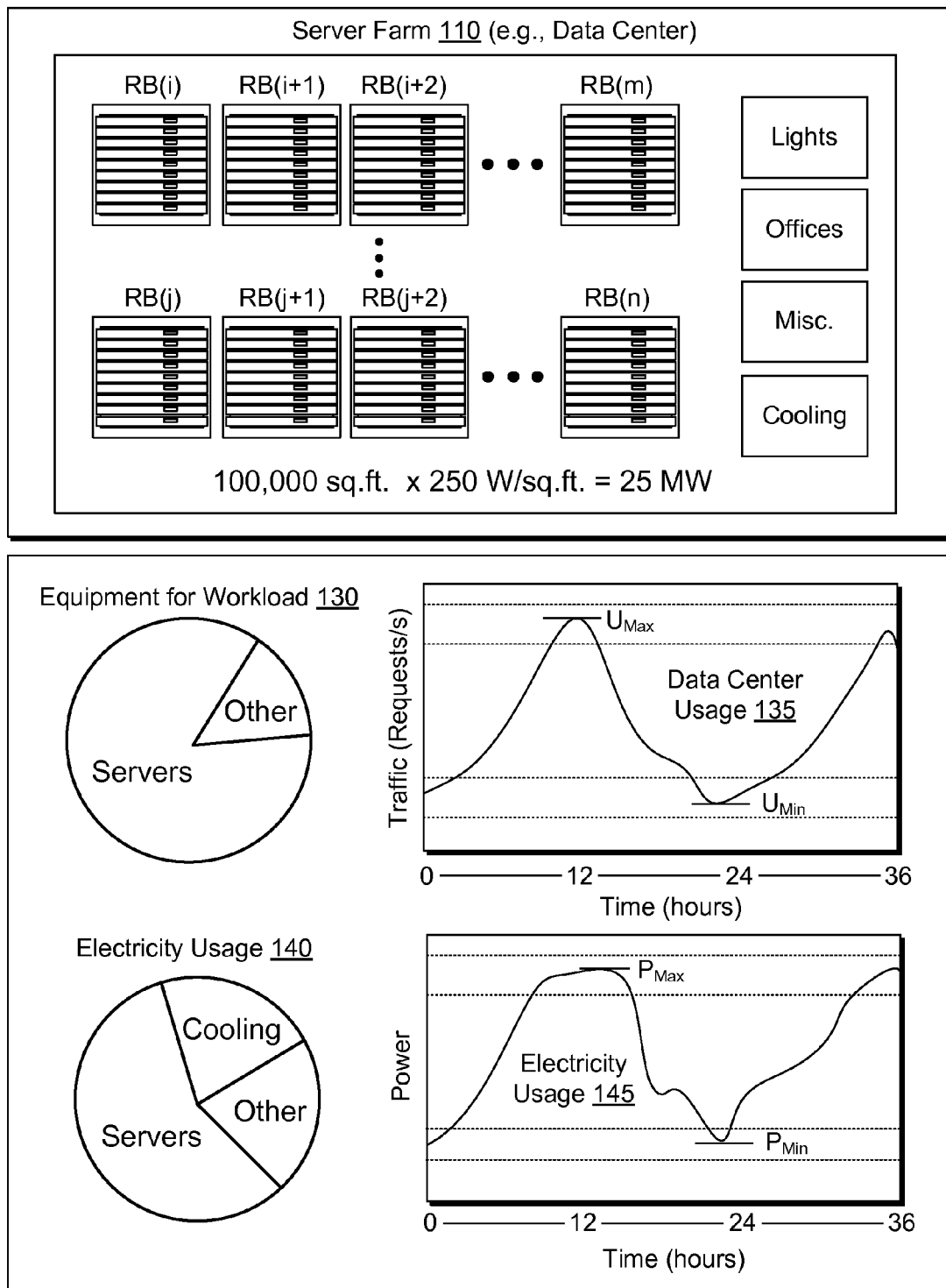
FIG. 1 is a diagram of a server farm along with plots of workload and power consumption versus time for the server farm.

FIG. 1 shows a server farm (or data center) 110 that includes servers, lights, office equipment, miscellaneous equipment and cooling equipment that typically includes a so-called computer room air conditioning unit (CRAC). Specifically, a CRAC unit is typically a device that monitors and maintains the temperature, air distribution and humidity in a network room or data center. A CRAC unit normally includes a processor-based controller that provides such functionality.

In general, a data center is designed to provide some number of watts of critical load, i.e., the electrically powered equipment can consume no more than a critical load. In practice, most data centers are not fully populated because the critical load is reached at prior to using all available floor space. In the example of FIG. 1, the server farm 110 may have about 100,000 square feet and a critical load of 250 watts per square foot for a total critical power consumption of about 25 MW.

In a data center, servers are the primary equipment responsible for directly handling workload, as indicated by a pie chart 130. Other equipment includes routers, other network devices, storage and the like. With respect to data center usage, a plot 135 of data center usage versus time shows that traffic in requests per second can vary greatly, for example, by a factor of two or more. Other measures of workload include megabits per second. A selected measure or measures for workload, for purposes of management, may depend on type of service or services operating in a server farm. In general, for particular services, a data center will experience a somewhat regular usage cycle with a maximum usage falling within a maximum usage band (see, e.g., dashed lines) and a minimum usage falling within a minimum usage band (see, e.g., dashed lines).

As described herein, a power model can be specified in terms of total power (what a utility or utilities provide) and critical power (what is supplied to servers in a server farm). In such a model, cooling and other overhead power usage can be defined as the difference between current supplied power by the utility or utilities and current consumed power by the IT equipment.

As described herein, an exemplary power management system can acquire information from equipment in a server farm and manage power based in part on such information. Such a system may rely on a power model to manage power consumption of a server farm. For example, a system can include a processor-based controller that relies on control logic where the control logic manages power consumption based in part on a power model.

A pie chart 140 indicates how electricity usage may be divided amongst various tasks. While the chart 140 shows servers as consuming the greatest percentage of power, depending on design, climate, etc., cooling may consume the greatest percentage of power.

In many instances servers consume the most power, assuming they are powered for use. Power consumption for a server differs depending on whether it is "powered for use" or in "actual use" where power consumed in actual use typically further depends on workload. For example, servers at idle (on but doing nothing) consume X power and servers at a maximum load consume Y power where Y is usually more than 1.3*X and sometimes more than 1.5*X. A server operating at less than maximum workload consumes somewhere between X and Y, which may vary non-linearly with workload.

As discussed in more detail below, various mechanisms exist for matching server processing power to workload. When such mechanisms are implemented, power consumption follows workload, however, with some damping, as indicated in a plot 145 of power consumption versus time. This damping occurs in real-time. In other words, with conventional mechanisms, power reduction occurs in a direct response to workload. The coupling between workload and processing power reduction may reduce peak power consumption compared to a system with no power saving mechanism, however, coupling alone does not address some power billing parameters (e.g., load factor with respect to time), which are discussed further below.

Variations can occur in power consumption, for example, seasonal or diurnal differences may exist as factors such as sunshine and ambient temperature can affect power consumed in cooling a data center. In other words, on a hot and sunny summer day, a CRAC will require more power to cool a server farm compared to a cold and overcast winter day as the temperature difference between the heated cooling fluid and the external environment is reduced. This temperature difference acts as a driving force for removing heat from the cooling fluid.

As described herein, cooling equipment can include a variety of equipment. While a CRAC unit is mentioned (where AC refers to "air conditioning") other types of cooling equipment may be used alternatively or in addition to an air system (e.g., water-based, etc.). A conventional CRAC unit normally uses a self-contained refrigeration cycle to remove heat from a space(s) and a heat rejection system to transfer the heat to the environment. The heat rejection system typically takes one of the following forms: condensing unit, fluid cooler or cooling tower to discharge heat to the environment (e.g., surrounding air/water of a data center).

Additional factors that can complicate data center power management include: (i) increase in power consumption of modern server components, primarily processors; and (ii) industry direction towards creating more densely packed server form factors, e.g. blades. With respect to server power consumption, while computational performance has been increasing according to Moore's law, energy efficiency is increasing at a lesser rate. For example, between the years 2000 and 2006, computational performance increased by a factor of nearly 300 while energy efficiency increased by a factor of about 8. Consequently, during this period, power consumption per computational unit decreased by about 90 percent and power consumption rose by a factor of about 3.5.

Some processor vendors have focused on lowering the power footprint in an effort to decrease power levels. Some processor vendors offer multiple power options for each processor family. These options enable server vendors to offer a family of servers for each processor family where each server has a different cost point. To date, most enterprise customers have chosen expensive servers for data centers where these servers offer higher levels of performance but consume more power.

With the increase of power consumption within the server, design of server cooling systems has become quite complex. This is especially true in blade form factors. Server vendors typically design their enterprise servers to support an entire processor family. In order to offer the highest performing processors they have to deal with the worst case scenario for data center power and cooling.

As a moderate example, consider a fully populated 42U rack that contains six blade chassis and 168 processors. In this configuration the processors alone would require a power budget of over 20 KW. Most modern blade chassis have very complex cooling systems. What makes matters worse is that the data center cooling infrastructure consumes a large amount of power. As indicated by the pie chart 140, estimates on the overhead on power consumption for cooling of a server range from 40% to 100% of the power drawn by the server.

Accounting for all of the foregoing factors, the capacity of a data center is typically limited by its power and cooling capacity. The major problem that customers are experiencing today is that data center power and cooling infrastructure cannot support the increase in server power density. The capacity of a data center is measured by its ability to cool the heat that is dissipated. Conventional data centers typically support around 100 watts per square foot of cooling when using industry standard 19 inch racks while newer data centers may support over 200 watts per square foot. In either instance, a fully populated blade chassis can have a power rating higher than the power rating for an entire rack. As mentioned with respect to the power model, the limiting factor for a data center is total power the data center can make available to critical load and the data center cooling capacity. The result of this problem is that customers sparsely utilize space in their data center. They limit the number of servers deployed to each rack and also leave gaps between racks to facilitate cooling.

The data center of today is a mission critical resource. Down time in the data center and the disruption this causes to the business is not acceptable. To address this, customers typically deploy redundant paths for cooling and power. In a failure situation each of these redundant paths must provide enough capacity to keep the entire data center operational. This further restricts the capacity of the data center. Additionally, many data centers include a power plant with enough power generating capacity to keep the data center online indefinitely if mains power is disrupted. A data center may also have one or more redundant generators.

Problems resulting from under utilization of data center space vary depending on data center construction. Legacy data centers have limited cooling capacity and many customers are running out of capacity quickly. In some cases there is an abundance of physical space to deploy more racks and servers, but power or cooling capacity is exhausted. There are other scenarios with more modern data centers that have limited physical space and don't have enough cooling capacity to increase the utilization level of the racks within the physical constraints. Whatever the problem, solutions can be expensive. Many customers are facing a situation where they know they will run out of data center capacity at some time in the future and the cost to build a new data center typically runs into hundreds of millions of dollars.

With respect to billing, peak power demand is an often used parameter that factors into a monthly billing equation. Peak demand can be defined, for example, as the highest consumption of electricity over a set time window (e.g., 15 or 30 minutes), which is then converted to an hourly interval. The time window is often referred to as a "demand window", which is a period of time in which peak demand is determined. Peak demand factors into billing because capacity must exist to meet the highest instantaneous demand. In other words, demand increases require utility peaking capacity, new generation, delivery, and transmission assets. On the other hand, uneven load results in idle utility resources.

Conservation alone is not always an effective means of reducing energy costs. As mentioned, conventional mechanisms to reduce power consumption operate largely based on conservation principles coupled with data center workload. As described herein, various exemplary techniques can improve scheduling efficiency, which, in turn, can increase load factor and even demand (i.e., reduce peaks and even load). In general, load factor is defined as an average power consumed by a data center divided by a peak power consumed by the data center over a period of time. Changes in electric profile may make alternative rates more attractive, noting that it is often the customer's responsibility to determine the optimum schedule.

Figure 2:
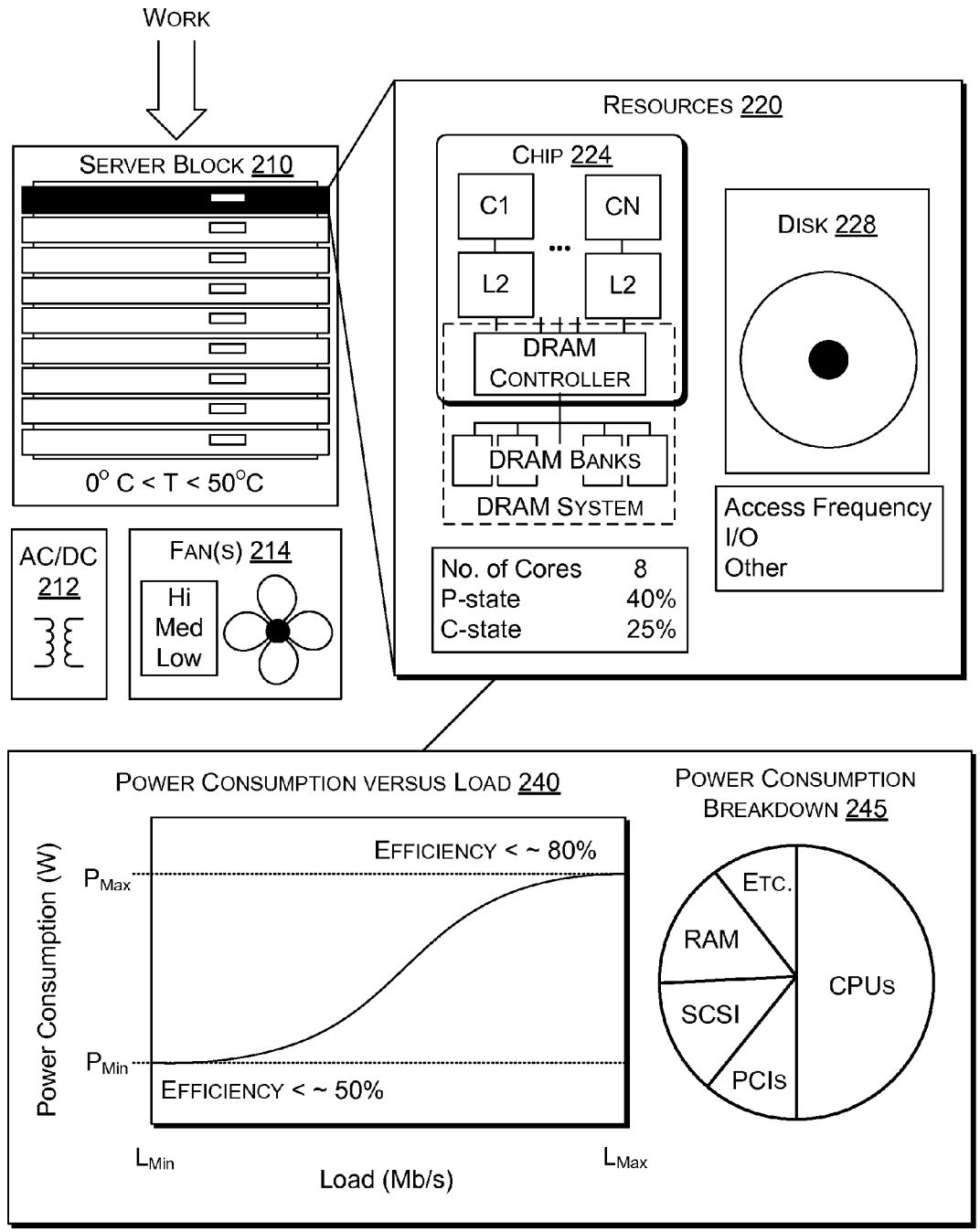
FIG. 2 is a diagram of a server block, server resources and a plot of power consumption versus workload for a server.

FIG. 2 shows a server block 210 that includes a plurality of individual servers, a power transformer 212 and one or more fans 214. Each server in the block 210 includes resources 220, referred to herein as computational and/or storage resources. For example, the resources 220 include a chip 224 with multiple cores and a DRAM system and a disk 228 for storing data and/or instructions.

The resources 220 and other resources associated with individual servers in the server block 210 typically consume power in a non-linear fashion with respect to workload. A plot 240 of power consumption versus workload indicates that a server is less efficient at lower loads (e.g., in Mb/s) than at higher loads; noting that a server consumes more power at higher loads. Data from a two year-old server SKU shows idle power consumption of about 160 W and full-load consumption of about 230 W. A modern server with multiple processors consumes significantly more energy. For example, when fully loaded, the active components in a typical high performance dual processor server consume about 380 W.

A pie chart 245 shows an approximate breakdown of how power is consumed in a server. In general, CPUs consume around 50% or more of the power to a server while other components account for around 220 W, which takes the power budget to 600 W per server. In an example where 50% of the power dissipated by a server is consumed by the cooling infrastructure to cool the server, power consumption for a single dual processor server can be around 900 W.

A common design point for modern data centers calls for a "power usage effectiveness" (PUE) of about 1.7 (i.e., for each 1 W of critical load requires roughly 0.7 W of cooling, power transmission losses, and other overhead). For example, if a server demands 900 W and the PUE for the datacenter is 1.7, then the power from the utility needed to deliver 900 W to the server is 1530 W. The reciprocal of PUE is "data center efficiency" (DCE), for example, a DCE value of 0.59 (equivalent to a PUE of 1.7) indicates that the IT equipment consumes 59% of the power to the data center. Another metric is "data center performance efficiency" (DCPE), which is defined as useful work divided by total facility power. Control logic for a data center power management system optionally includes criteria, parameters, etc., specified in terms of PUE, DCE and/or DCPE.

As described herein, a management system reduces power consumption of a data center based in part on data center usage information and power consumption. Power consumption is included as it is directly related to cost of operating a data center. Such an approach includes aspects of scheduling rather than merely conserving power in direct response to current workload. For example, given the data center usage information in the plot 135, adjustments can be made to how servers handle workload in a data center to reduce power consumption. In particular, adjustments can be made to reduce power consumption during server usage peaks. Reductions in peak power consumption can greatly reduce power costs. Various techniques clip peaks and fill valleys (e.g., smear workload forward in time).

With respect to reduction of peak power consumption, power is usually charged at the 95th percentile over the course of a month. While some negotiated power purchase rates are more complex than this percentile approach, a management system can be applied to any of a variety of billing equations.

An exemplary management system optionally acquires billing information (e.g., billing equations) from one or more power providers (e.g., utility companies) and manages power consumption based in part on such information. An exemplary management system optionally acquires power demand and/or generation information (e.g., from one or more power providers, such as a utility companies) and manages power consumption based in part on such information. An exemplary management system may manage power consumption of a data center (or data centers) based in part on billing information and power demand and/or generation information. With respect to power demand and/or generation information, such information may be historical information, real-time information and/or predicted information for some future time. For example, if a utility knows that a reactor will be shut down for service, then an exemplary power management system may rely on such information to manage power consumption of a data center and/or manage power supply to the data center (e.g., using supplemental power from an on-site generator, an alternative utility, etc.).

Figure 3:
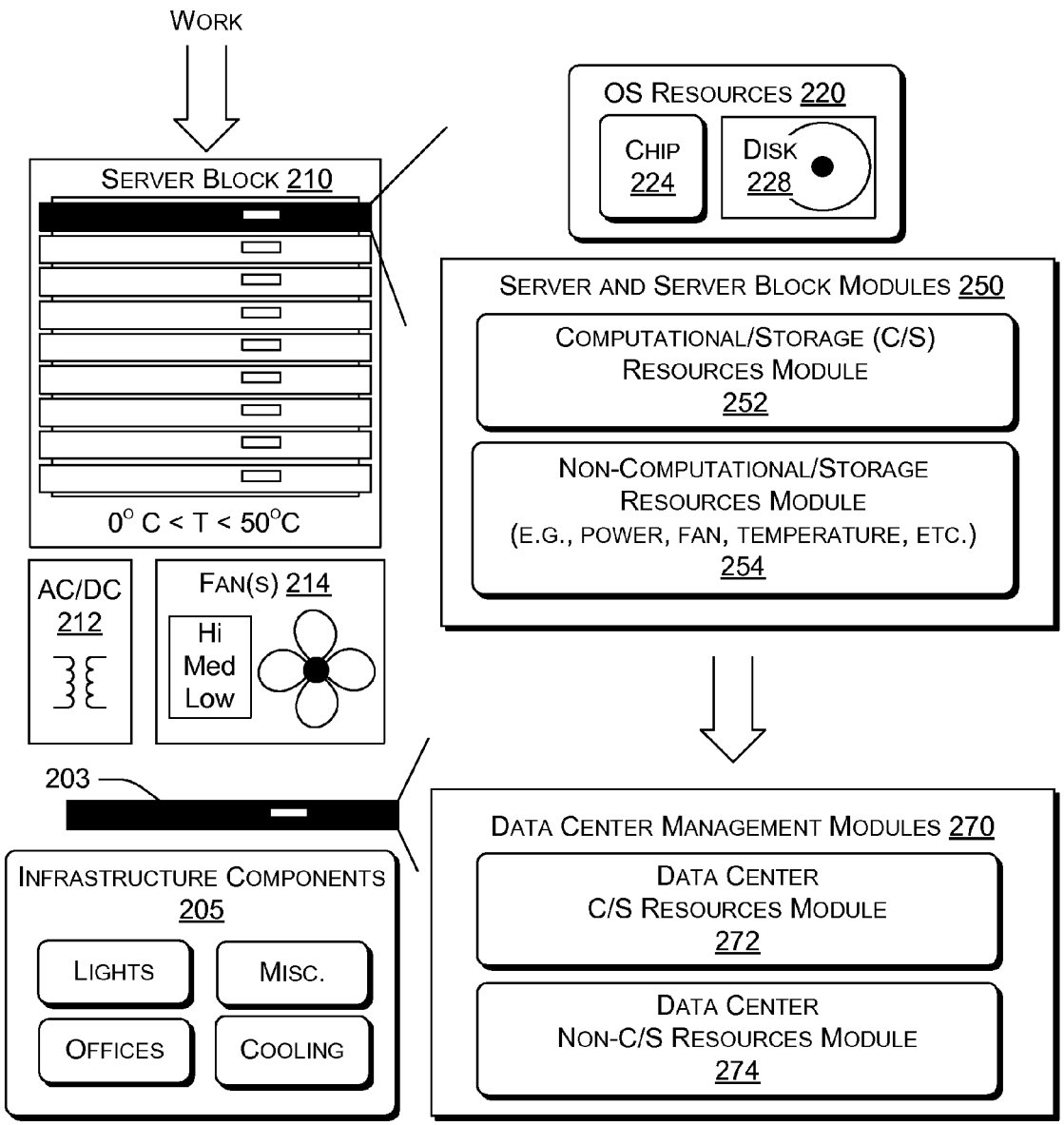
FIG. 3 is a diagram of a data center resources and various exemplary modules for controlling the resources to shape data center power consumption.

FIG. 3 shows a server block 210, a server and optionally server block level modules 250 for information germane to resources for a specific server in the server block 210 or to resources for the entire server block 210 and data center management modules 270 for information germane to resources in an entire data center.

The server/server block modules 250 include a computational/storage resources module 252 for information germane to resources 220 under control of an OS of an individual server (e.g., chip 224, disk 228, etc.). Another module 254 pertains to information for non-computational/storage resources such as the power supply 212, fans 214, temperature(s), etc.

Each individual server in the server block 210 may operate using an OS that includes one or more features of a Microsoft® Windows Server® OS. A server may include a reliability and performance monitor (e.g., as a snap-in) that provides for performance logs and alerts, server performance, system monitoring, customizing data collector sets and event trace sessions.

In general terms, performance is the measure of how quickly a computer completes application and system tasks. Overall system performance might be limited by the access speed of the physical hard disks, the amount of memory available to all running processes, the top speed of the processor(s), or the maximum throughput of one or more network interfaces.

The reliability of a system is the measure of how often the system operates as it is configured and expected to perform. Reliability can be reduced when applications stop responding, services stop and restart, drivers fail to initialize, or in the worst case, when operating systems fail. A reliability monitor can indicate stability of a system and track events that can help identify causes of reductions in reliability. Such a monitor can record failures (including memory, hard disk, application, and operating system failures) and key events regarding the configuration of a system (including installation of new applications and operating system updates). A monitor can provide a timeline of changes in both the system and reliability, and can help identify how to get a system back to optimal reliability when it does not behave as expected.

The module 252 optionally allows for a display of real-time information for CPU, disk, network and memory usage. The module 254 optionally allows for display of real-time information related to non-computational/storage resources such as the power supply 212, the fan(s) 214, etc.

The data center management modules 270 include a data center computational/storage resources module 272 and a data center non-computational/storage resources module 274. The module 272 can aggregate information from various servers or server blocks while the module 274 can handle information from infrastructure components 205. The modules 270 may be implemented using a computing device 203 located in a data center or using a computing device located remotely from a data center (e.g., in communication with a data center via a network).

Figure 4:
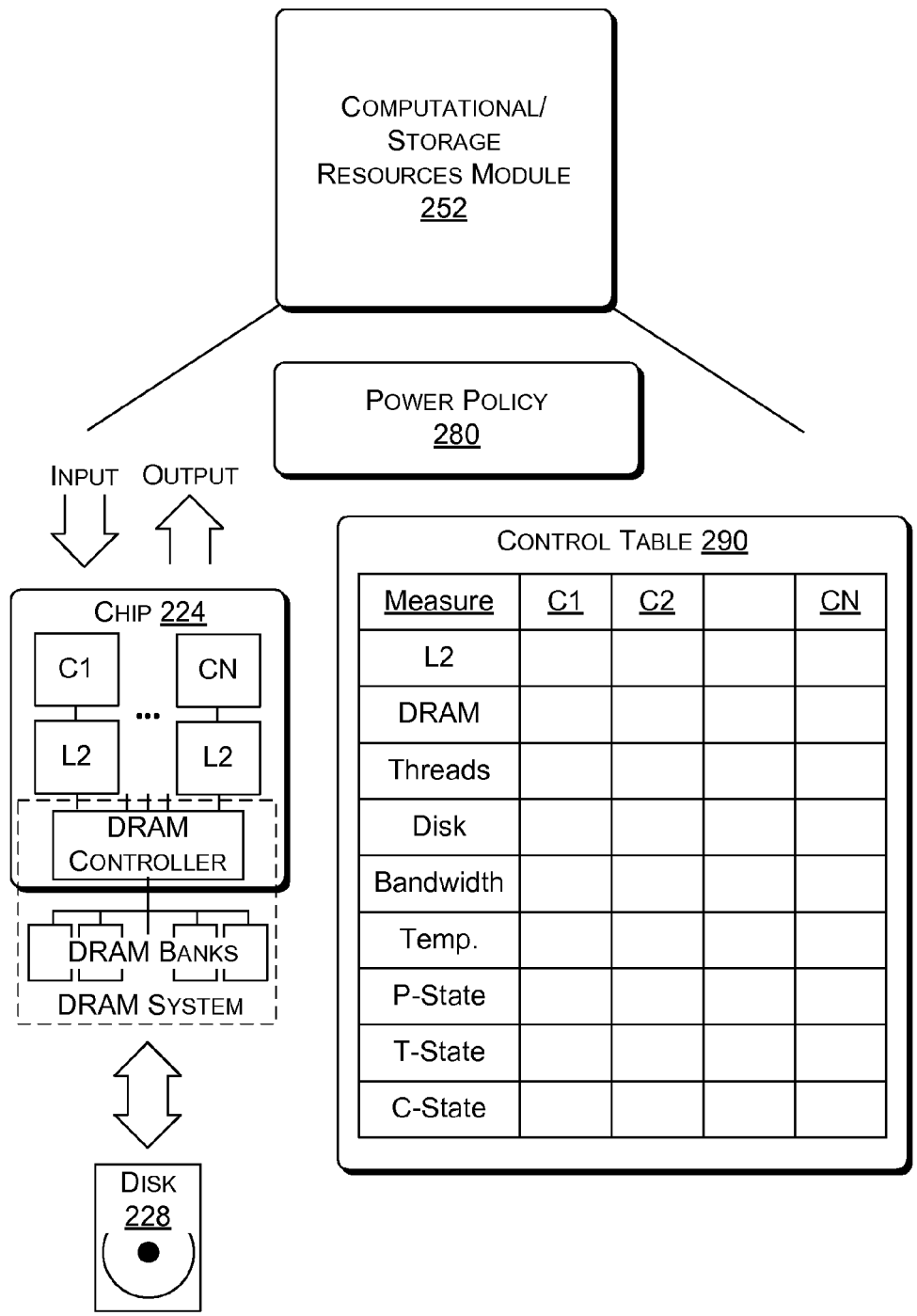
FIG. 4 is a diagram of a server or server block level module, a power policy and a control table of information that may be used in implementing the power policy.

FIG. 4 shows the module 252 of FIG. 3 along with a power policy 280 and a control table 290 of resource related information. The control table 290 includes information for resources such as the multicore chip 224 as its associated DRAM system and disk(s) 228. For example, the control table 290 can include information on L2, DRAM, threads, disk, bandwidth, temperature, P-states, T-states, C-states on a core-by-core or other basis. The module 252 can access the power policy 280 and information in the control table 290 and optionally adjust one or more resource parameters to attain a policy goal. The module 252 can account for workflow, illustrated in FIG. 4 as input/output from a resource or set of resources.

As mentioned, the module 252 can operate cooperatively with one or more other modules such as the non-computational/storage resource module 254 and one or more of the data center management modules 270. In general, the module 252 operates at a level that allows for adjustments to resource parameters of an individual server. The module 252 may be part of an operating system of a server.

The module 252 can adjust one or more resource parameters that affect power consumption of an individual server. When a server is active (e.g., processing a request), the module 252 can adjust a P-state and/or a T-state of one or more cores. More specifically, P-states are core performance states associated with dynamic voltage and frequency scaling that allow for a reduction in power consumption by a core for every step back in core performance, which results in more than linear savings in power. T-states are throttle states that involve linear scaling of a core clock to reduce instantaneous power of a core. For example, a 50% reduction in core clock speed will cause a work task to be processed in twice as much time. C-states are often referred to as "sleep states" and used when no work is being performed by a core.

In conventional optimization for maximum performance at the minimum power consumption, a combination of software (e.g., operating system) and hardware elements are used. For example, Intel® Duo Core processors (Intel Corporation, Santa Clara, Calif.) include power and thermal management technology (PTMT). According to the Intel® PTMT, when a core is active, it always runs at C0, but when the core is idle, an OS typically tries to maintain a balance between the amount of power it can save and the overhead of entering and exiting to/from that sleep state. Thus C1 represents the power state that has the least power saving but can be switched on and off almost immediately, while an extended deep-sleep (DC4) represents a power state where the static power consumption is negligible, but the time to enter into this state and respond to activity (back to C0) is quite long.

According to the PTMT, when an OS scheduler detects there are no more tasks to run, it transitions the processor into the "selected" idle state, by executing a BIOS defined instruction sequence. The processor will remain in that idle state until a break event occurs and then return to the C0 state. Break events would typically be interrupts and similar indicators that new tasks need to be executed.

PTMT aims to achieve a progressive increase in static power savings per state by employing more aggressive means as the C-state deepens. In C1 idle state, only processor-centric measures are employed: instruction execution is halted and the core clocks are gated. In C2 states and above, platform-level measures are also added to further increase the power savings. While in the C2 state, the processor is obligated not to access the bus without chipset consent. Thus, the front side bus can be placed in a lower power state, and the chipset can also initiate power-saving measures. In C3, the processor also disables its internal Phase Locked Loops. In C4, the processor also lowers its internal voltage level to the point where only content retention is possible, but no operations can be done. A Deep-C4 is also available in the PTMT.

The ACPI standard sets forth a mechanism to control dynamic power consumption by adjusting active power consumption to the "computational" needs of the software. The PTMT controls the P-state of the system by a combination of hardware and software interfaces: the hardware defines a set of "operational points" where each one defines a different frequency/voltage and therefore different levels of power consumption. The OS aims to keep the system at the lowest operational point yet still meet the performance requirements. In other words, if it anticipates that the software can efficiently use the maximum performance that the processor can provide, it puts it in the P0 state. When an OS predicts (e.g., based on history) that the lower (and slower) operational point can still meet the performance requirements, it switches to that operational point to save power.

Power consumption produces heat that needs to be removed and conventional PTMT usually chooses the maximum frequency the core can run without overheating when running in a "normal" usage model; this is also called the Thermal Design Power (TDP). Thus, when an unexpected workload is used the thermal control logic aims to allow the system to provide maximum performance under the thermal constraints.

Threading can also affect power utilization. Various threading models exist, such as, balanced threading and imbalanced threading. According to an Intel® Corporation study, minimizing synchronization points between threads leads to more time spent in the parallel section which translates to better power savings. Further, thread imbalance may cause performance degradation and may not provide power benefits as compared to balanced threading. Specifically, applications with an imbalanced threading model may show lesser performance improvement as compared to a balanced threading model; and hence consume more power than the balanced implementation.

Figure 5:
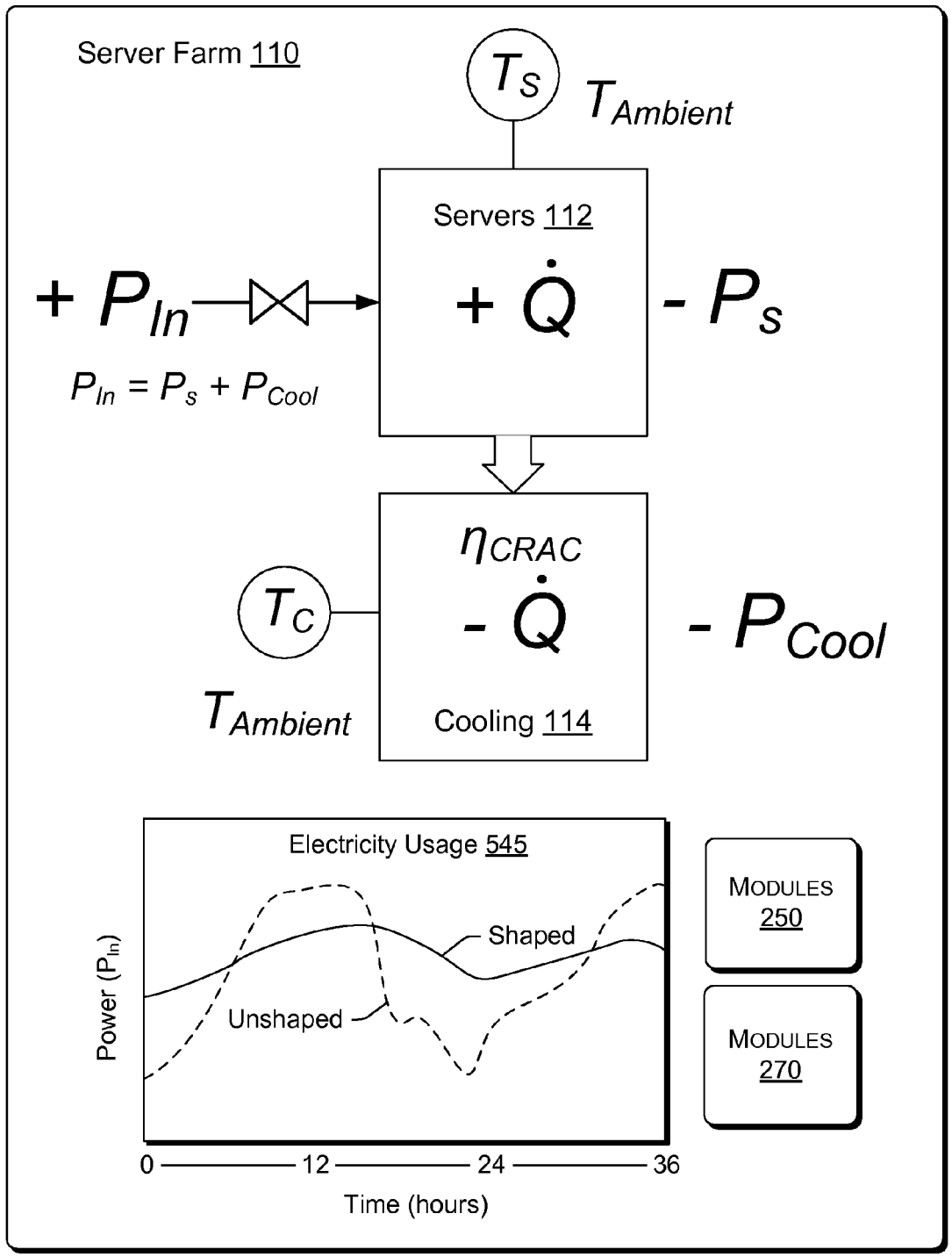
FIG. 5 is a diagram of an exemplary system for shaping power consumption of a data center.

Given the foregoing description on resource controls, as described herein, various exemplary techniques aim to control power consumption of an entire data center. FIG. 5 shows an exemplary system 500 that includes a data center or server farm 110 along with power consumption and heat removal equations. The server farm 110 consumes power $P_{In}$ according to an overall load or demand, which, in this example, is the sum of the power consumed by servers and server specific infrastructure $P_s$ in the server farm and power consumed by cooling equipment (e.g., CRAC, etc.) $P_{Cool}$ in cooling the server farm 110. Heat transfer considerations include the temperature of the server environment, the temperature and condition of cooling fluid provided by the CRAC and ambient temperature and conditions.

An exemplary method manages $P_{In}$ by managing $P_s$, which in turn has an affect on $P_{Cool}$. For example, an exemplary method for managing power consumption of a data center includes monitoring power consumption of a data center, comparing power consumption to a power consumption threshold, based on the comparing, deciding whether to implement a power policy where the power policy reduces power consumption by the data center and increases a load factor where the load factor is an average power consumed by the data center divided by a peak power consumed by the data center over a period of time.

The modules 250 and 270 operate on a server or server block level and at a data center level to shape power consumption by the data center 110, as indicated by a plot 545 of electricity usage versus time. In particular, the modules 250 and 270 shape power consumption by clipping peaks and filling valleys. The modules 250 and 270 can be instructed to account for billing equations provided by a utility or utilities. In some instances, a data center may have a choice on sources of power. A data center may have one or more on-site power generators and one or more off-site providers. In such a scenario, a data center level module may call for switching to a more optimal source or sources to avoid an increase in cost.

An exemplary method may adjust one or more server parameters based in part on cyclical information for cooling (e.g., CRAC operation). For example, if workload is increasing for a data center and power consumption rising, responsive action may account for trends in CRAC operation such as decreased cooling requirements for nighttime operation or expected weather-related changes.

Figure 6:
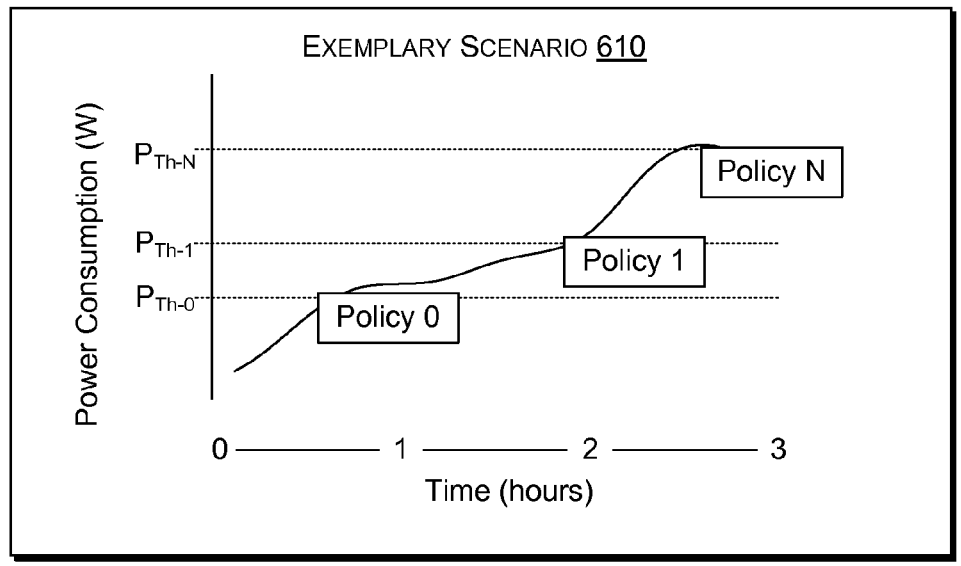
FIG. 6 is a diagram of an exemplary scenario and power policies that can shape power consumption of a data center.
Figure 6:
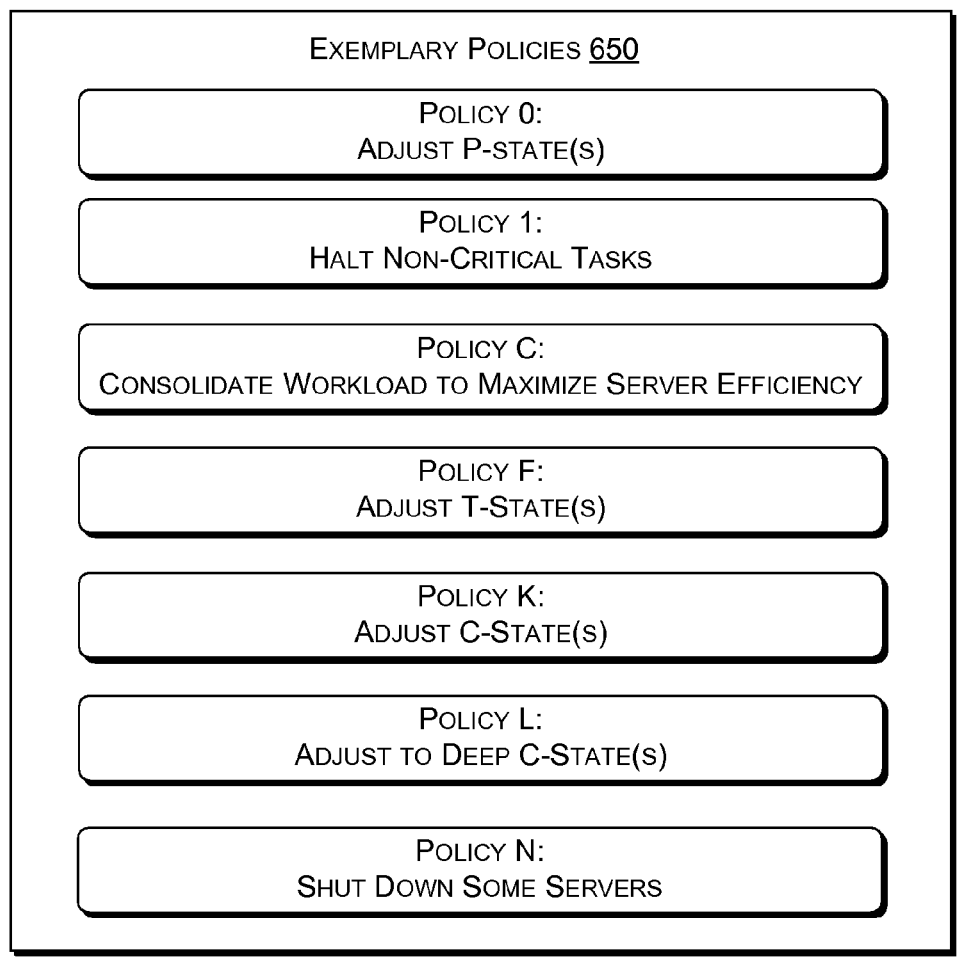

FIG. 6 shows an exemplary scenario 610 and some exemplary policies 650 to manage power consumed by a data center. The scenario 610 is illustrated as a plot of power consumption versus time where power consumption thresholds can trigger one or more of the policies 650. The policies 650 are tiered to more drastically reduce power consumption. Again, power rates are often tied to peak utilization; hence, the policies 650 can reduce risk of incurring power peaks that cause increases in cost of power. For example, the policies 650 can be implemented in a manner such that power peaks for a data center over a monthly billing cycle are reduced and thereby cost of power for the month is reduced. Policies may be implemented based in part on information such as billing information, power demand information (e.g., for customers served by a utility company), generation information (e.g., hydroelectric generation capacity, nuclear generation capacity, coal generation capacity, etc.).

According to the scenario 610, at a time T0, the power consumption for a data center exceeds a power threshold $P_{Th\text{-}0}$. In turn, an exemplary method implements a corresponding policy, Policy 0, which adjusts one or more P-states for servers in the data center. As workflow to the data center may continually increase or ambient conditions may change to increase power demands for cooling, the power consumption may still rise to a threshold $P_{Th\text{-}1}$ at a time $T_1$. In this instance, the method implements Policy 1, which halts non-critical tasks. By itself, this may not prevent the data center from consuming more power. As indicated in the scenario 610, power consumption continues to rise. Intermediate thresholds may call for policies such as Policy C (consolidate workload), Policy F (adjust T-state(s)), Policy K (adjust C-state(s)), Policy L (adjust to Deep C-state(s)), and Policy N (shut down some servers). In some instances, a policy to consolidate workload (e.g., Policy C) can be used in conjunction with one or more other policies (e.g., Policy 0, F, K, L, N, etc.).

Such policies can aim to achieve optimal handling of workload given the goal of keeping power consumption below some peak value. For example, with respect to T-states, as mentioned, a reduction in clock speed can increase the time of handling a task. Referring to the plot 140 of data center usage, such a policy may effectively handle workload without significant disruption to customers. In particular, a T-state policy can act to flatten peaks over an extended period of time such that power consumption for a data center does not exceed a power consumption target. In this example, customers may wait a bit longer for workload to be processed, however, opportunities exist to pass along saving to the customers where the savings are achieved by reducing peak power consumption over a billing cycle.

Figure 7:
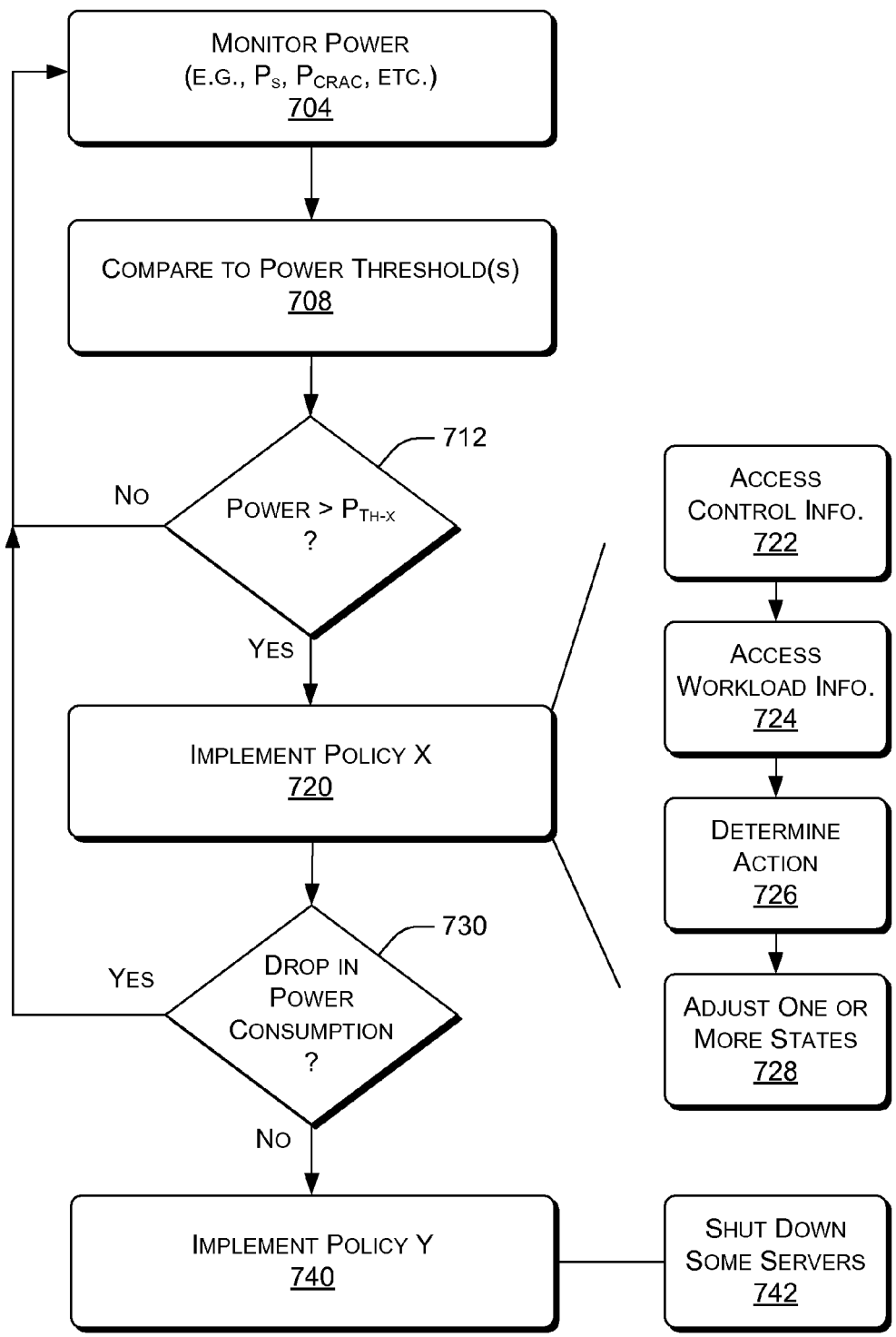
FIG. 7 is a diagram of an exemplary method for implementing one or more power policies to shape power consumption by a data center.

FIG. 7 shows an exemplary method 700 for implementing one or more policies related to data center power consumption. The method 700 commences in a monitoring block 704 that monitors power consumed by a data center. A comparison block 708 compares the power to one or more power thresholds. A decision block 712 decides if the power exceeds one or more of the power thresholds. If the power consumed does not exceed a threshold (or a particular threshold), then the method 700 continues at the monitoring block 704. However, if the decision block 712 decides that the power consumption exceeds a threshold (or thresholds), then the method 700 enters an implementation block 720 that implements a particular policy, for example, Policy X. Policy X may access control information 722 (see, e.g., control table 290) for one or more servers, access workload information 724, determine an action 726 and adjust one or more states 728 for one or more servers in the data center. As mentioned, such states may be P-states, T-states and/or C-states. More generally, a state-based scheme may be used for resources where states correspond to core-related states and other types of states (e.g., fan states, power supply states, etc.).

After implementation of Policy X, the method 700 continues in a decision block 730 that decides whether implementation of Policy X reduced power consumption of the data center. If implementation of Policy X reduced power consumption, then the method 700 returns to the monitoring block 704; otherwise, the method 700 calls for more aggressive action in an implementation block 740 that implements Policy Y, which calls for shutting down some servers 742.

As described herein, an exemplary system can defer batch (e.g., batch jobs) and non-synchronous workload as a data center approaches a power peak threshold. Such a system can exploit the difference between idle and max load power consumption and reduce overall peaks. As the server power consumption moves away from a peak, the system can optionally reschedule this non-critical workload. Using such a technique, the system throttles back the power consumption and knock off the peaks by filling the valleys. In other words, the system can forward time flatten power peaks.

An exemplary system can take any of a variety of actions to flatten power peaks. For example, a system may shut off non-needed servers and use workload peak clipping and trough filling to allow the workload to be run with fewer servers turned on. Using this technique it may actually be possible to run the service with fewer servers overall.

Keeping servers off conserves power and not needing them at all would save even more. In some instances, workload peaks are driven by batch jobs and SQL Server checkpoints. An exemplary method can reduce both by changes in the service and in SQL Server and, as a consequence, reduce peaks by spreading the workload out more evenly.

Applying such a technique to power has a huge potential upside because power provisioning and cooling dominates the cost of a data center. Filling valleys allows better data center utilization in addition to lowering power consumption charges.

In general, various exemplary techniques described herein may be referred to as resource-shaping techniques. Such techniques smooth power consumption spikes by knocking off peaks and filling valleys, which can apply to any of a variety of data center resources.

With respect to data center design, conventional design calls for buying servers to meet the highest workload requirements. To some degree, knocking off peaks and filling valleys can translate to fewer servers. Such an approach also applies to internal networking. Resource shaping as a technique applies to all resources across the data center.

Figure 8:
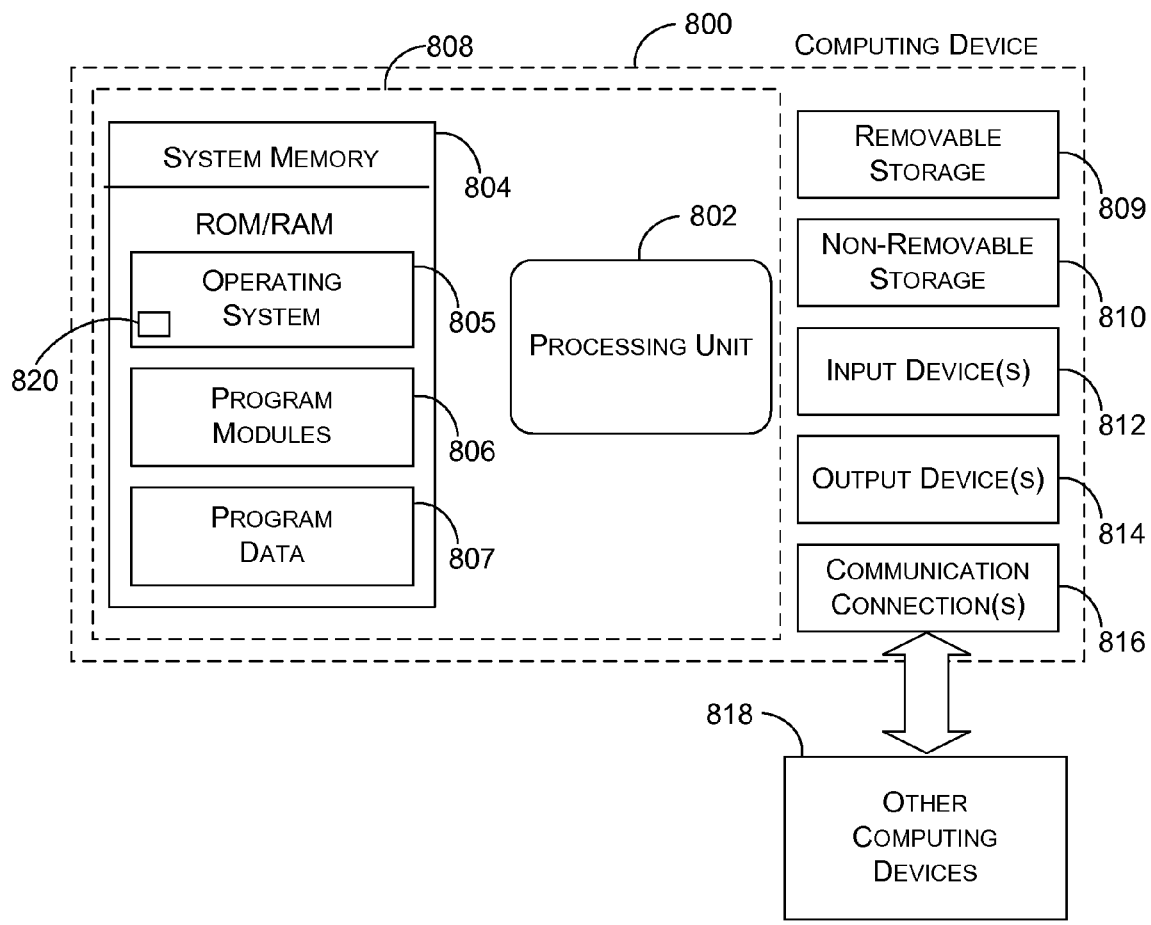
FIG. 8 is a block diagram of an exemplary computing device.

FIG. 8 illustrates an exemplary computing device 800 that may be used to implement various exemplary components and in forming an exemplary system. For example, the servers of the system of FIG. 1 may include various features of the device 800. An exemplary controller for managing power consumed by a data center may include various features of the device 800.

In a very basic configuration, computing device 800 typically includes at least one processing unit 802 and system memory 804. Depending on the exact configuration and type of computing device, system memory 804 may be volatile (such as RAM), non-volatile (such as ROM, flash memory, etc.) or some combination of the two. System memory 804 typically includes an operating system 805, one or more program modules 806, and may include program data 807. The operating system 805 include a component-based framework 820 that supports components (including properties and events), objects, inheritance, polymorphism, reflection, and provides an object-oriented component-based application programming interface (API), such as that of the .NET™ Framework manufactured by Microsoft Corporation, Redmond, Wash. The device 800 is of a very basic configuration demarcated by a dashed line 808. Again, a terminal may have fewer components but will interact with a computing device that may have such a basic configuration.

Computing device 800 may have additional features or functionality. For example, computing device 800 may also include additional data storage devices (removable and/or non-removable) such as, for example, magnetic disks, optical disks, or tape. Such additional storage is illustrated in FIG. 8 by removable storage 809 and non-removable storage 810. Computer storage media may include volatile and nonvolatile, removable and non-removable media implemented in any method or technology for storage of information, such as computer readable instructions, data structures, program modules, or other data. System memory 804, removable storage 809 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 800. Any such computer storage media may be part of device 800. Computing device 800 may also have input device(s) 812 such as keyboard, mouse, pen, voice input device, touch input device, etc. Output device(s) 814 such as a display, speakers, printer, etc. may also be included. These devices are well know in the art and need not be discussed at length here.

Computing device 800 may also contain communication connections 816 that allow the device to communicate with other computing devices 818, such as over a network. Communication connections 816 are one example of communication media. Communication media may typically be embodied by computer readable instructions, data structures, program modules, or other data forms. By way of example, and not limitation, communication media includes wired media such as a wired network or direct-wired connection, and wireless media such as acoustic, RF, infrared and other wireless media. The term computer readable media as used herein includes both storage media and communication media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for managing power consumption of a data center, the method comprising:
    monitoring power consumption of a data center;
    comparing power consumption to a power consumption threshold;
    based on the comparing, deciding whether to implement a power policy wherein the power policy reduces instantaneous power consumption by the data center and increases a load factor wherein the load factor is an average power consumed by the data center divided by a peak power consumed by the data center over a period of time.

2. The method of claim 1 wherein the data center comprises multi-core servers.

3. The method of claim 1 wherein the power policy comprises adjusting performance states associated with dynamic voltage and frequency scaling.

4. The method of claim 3 wherein the adjusting performance states causes a delay in processing workload of the data center and decreases instantaneous power consumption of the data center.

5. The method of claim 1 wherein the power policy comprises adjusting throttle states.

6. The method of claim 5 wherein the adjusting throttle states causes a delay in processing workload of the data center and decreases instantaneous power consumption of the data center.

7. The method of claim 1 wherein the data center comprises servers and the power policy comprises shutting down at least some of the servers.

8. The method of claim 1 wherein the power policy comprises adjusting sleep states.

9. The method of claim 8 wherein the adjusting sleep states decreases instantaneous power consumption of the data center.

10. The method of claim 1 wherein the power policy comprises redirecting requests for data center resources to one or more other data centers.

11. The method of claim 1 wherein the data center comprises servers and wherein the power policy comprises consolidating workload to increase efficiency.

12. The method of claim 2 wherein the power policy further comprises adjusting sleep states of at least some of the servers.

13. A method for managing power consumption of a data center, the method comprising:
    monitoring power consumption of a data center;
    assessing power consumption with respect to a billing equation for power;
    based on the assessing, deciding whether to implement a power policy wherein the power policy reduces instantaneous power consumption by the data center and increases a load factor wherein the load factor is an average power consumed by the data center divided by a peak power consumed by the data center over a period of time.

14. The method of claim 13 wherein the power policy comprises selecting a different power source.

15. The method of claim 13 wherein the data center comprises multi-core servers and wherein the power policy comprises adjusting operational states for one or more cores of a multi-core server.

16. The method of claim 13 wherein the power policy comprises a policy that accounts for ambient temperature.

17. The method of claim 13 wherein the power policy comprises a policy that accounts for weather.

18. The method of claim 13 wherein the power policy comprises a policy that accounts for power consumption by a cooling unit.

19. The method of claim 18 wherein the policy accounts for cyclical power consumption by the cooling unit.

20. A module for shaping power consumption by a multi-core server, the module comprising:

instructions to adjust performance states responsive to a data center power consumption signal to reduce instantaneous power consumption by a multi-core server;

instructions to adjust throttle states responsive to a data center power consumption signal to reduce instantaneous power consumption by a multi-core server; and instructions to adjust sleep states responsive to a data center power consumption signal to reduce instantaneous power consumption by a multi-core server;

wherein a reduction in instantaneous power consumption by a multi-core server acts to increases a load factor for a data center wherein the load factor is an average power consumed by the data center divided by a peak power consumed by the data center over a period of time.

* * * * *